United States Patent
Huang-Fu et al.

(10) Patent No.: US 10,945,177 B2
(45) Date of Patent: Mar. 9, 2021

(54) METHOD AND APPARATUS FOR SESSION RELEASE IN WIRELESS COMMUNICATION

(71) Applicant: MEDIATEK INC., Hsinchu (TW)

(72) Inventors: Chien-Chun Huang-Fu, Hsinchu (TW); Chi-Hsien Chen, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 16/373,260

(22) Filed: Apr. 2, 2019

(65) Prior Publication Data
US 2019/0313478 A1 Oct. 10, 2019

Related U.S. Application Data

(60) Provisional application No. 62/655,137, filed on Apr. 9, 2018.

(51) Int. Cl.
*H04W 36/00* (2009.01)
*H04W 36/14* (2009.01)
(Continued)

(52) U.S. Cl.
CPC ......... *H04W 36/14* (2013.01); *H04L 47/2441* (2013.01); *H04L 47/2491* (2013.01);
(Continued)

(58) Field of Classification Search
CPC . H04W 36/14; H04W 28/0268; H04W 60/06; H04W 28/24; H04W 36/0011;
(Continued)

(56) References Cited

U.S. PATENT DOCUMENTS

2005/0226202 A1   10/2005  Zhang et al.
2018/0198867 A1*  7/2018  Dao .................. H04W 36/0016
(Continued)

FOREIGN PATENT DOCUMENTS

CN   1852196 A   10/2006
CN   1870821 A   11/2006

OTHER PUBLICATIONS

English translation of the International Search Report and Written Opinion of the International Searching Authority dated Jul. 11, 2019 in PCT/CN2019/081867 filed Apr. 9, 2019, citing documents AA, AO and AP therein, 9 pages.

*Primary Examiner* — Lakeram Jangbahadur
(74) *Attorney, Agent, or Firm* — Oblon, McClelland, Maier & Neustadt, L.L.P.

(57) ABSTRACT

Aspects of the disclosure provide an electronic apparatus and a method for wireless communication. The electronic apparatus can include processing circuitry. The processing circuitry can send one or more packet data unit (PDU) session release requests to a wireless communication network system to request a PDU session release procedure. In an embodiment, a timer is used for the one or more PDU session release requests. The processing circuitry can determine whether a network response is received from the wireless communication network system before the timer expires and whether a number of times that the timer expires reaches a predetermined number of times. The processing circuitry can locally release the PDU session when the network response is not received and the number of times that the timer expires reaches the predefined number of times.

18 Claims, 4 Drawing Sheets

(51) Int. Cl.
- H04L 29/08 (2006.01)
- H04W 24/02 (2009.01)
- H04W 76/38 (2018.01)
- H04W 28/24 (2009.01)
- H04W 60/06 (2009.01)
- H04L 12/851 (2013.01)
- H04L 12/857 (2013.01)
- H04L 12/863 (2013.01)
- H04L 29/06 (2006.01)
- H04W 28/02 (2009.01)
- H04W 88/02 (2009.01)
- H04W 84/04 (2009.01)

(52) U.S. Cl.
CPC ........ *H04L 47/6295* (2013.01); *H04L 67/141* (2013.01); *H04L 67/143* (2013.01); *H04L 69/22* (2013.01); *H04W 24/02* (2013.01); *H04W 28/0268* (2013.01); *H04W 28/24* (2013.01); *H04W 36/0011* (2013.01); *H04W 36/0033* (2013.01); *H04W 60/06* (2013.01); *H04W 76/38* (2018.02); *H04W 84/042* (2013.01); *H04W 88/02* (2013.01)

(58) Field of Classification Search
CPC . H04W 76/38; H04W 24/02; H04W 36/0033; H04W 84/042; H04W 88/02; H04W 36/0022; H04L 69/22; H04L 47/6295; H04L 47/2491; H04L 47/2441; H04L 67/143; H04L 67/141
See application file for complete search history.

(56) References Cited

U.S. PATENT DOCUMENTS

| | | | |
|---|---|---|---|
| 2019/0159157 A1* | 5/2019 | Gupta | H04W 60/005 |
| 2019/0174449 A1* | 6/2019 | Shan | H04W 60/00 |
| 2019/0174573 A1* | 6/2019 | Velev | H04W 76/12 |
| 2019/0239280 A1* | 8/2019 | Li | H04W 88/184 |
| 2019/0261260 A1* | 8/2019 | Dao | H04W 36/0011 |

* cited by examiner

US 10,945,177 B2

METHOD AND APPARATUS FOR SESSION RELEASE IN WIRELESS COMMUNICATION

INCORPORATION BY REFERENCE

This present disclosure claims the benefit of U.S. Provisional Application No. 62/655,137 filed on Apr. 9, 2018, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In wireless communications, a session can be established between a wireless communication device, such as a cellular phone, and a network system that provides services to the wireless communication device. The session can be maintained by the wireless communication device and the network system.

SUMMARY

Aspects of the disclosure provide an electronic apparatus and a method for wireless communication. The electronic apparatus can include processing circuitry. The processing circuitry can send one or more packet data unit (PDU) session release requests to a wireless communication network system to request a PDU session release procedure. In an embodiment, a timer is used for the one or more PDU session release requests. The processing circuitry can determine whether a network response is received from the wireless communication network system before the timer expires and whether a number of times that the timer expires reaches a predetermined number of times. The processing circuitry can locally release the PDU session when the network response is not received and the number of times that the timer expires reaches the predefined number of times. In an embodiment, the processing circuitry can send a PDU session status to the wireless communication network system after locally releasing the PDU session.

In an embodiment, the one or more session PDU release requests can include an identifier allocated for the PDU session release procedure. When the network response is not received and the number of times that the timer expires reaches the predefined number of times, the processing circuitry is further configured to abort the PDU session release procedure and release the allocated identifier.

In an embodiment, for each of the one or more PDU session release requests, the processing circuitry is further configured to start the timer when each of the one or more PDU session release requests is sent and determine whether the network response is received when the timer expires. When the timer expires and the network response is not received, the processing circuitry can determine whether the number of times that the timer expires reaches the predetermined number of times.

In an embodiment, the timer is a timer T3582.

In an embodiment, the wireless communication network system is a fifth generation (5G) wireless communication network system (5GS), the PDU session is between the electronic apparatus and a 5G core network (5GC) of the 5GS, and the one or more PDU session release requests includes an initial PDU session release request message followed by L additional PDU session release request messages where L is a positive integer. The processing circuitry is further configured to start the timer (L+1) times when the initial PDU session release request message and the L additional PDU session release request messages are sent, respectively. The processing circuitry can send each of the L additional PDU session release request messages each time the timer expires. The processing circuitry can locally release the PDU session when the timer expires (L+1) times.

In an embodiment, the one or more PDU session release requests include a procedure transaction identifier (PTI) allocated for the PDU session release procedure. When the network response is not received and the timer expires (L+1) times, the processing circuitry can abort the PDU session release procedure and release the allocated PTI.

In an embodiment, the processing circuitry can send a registration request to the 5GC that includes a PDU session status information element after locally releasing the PDU session.

In an embodiment, L is 4, and the processing circuitry is further configured to locally release the PDU session when the timer expires an fifth times.

Aspects of the disclosure provide a non-transitory computer readable medium having computer readable instructions stored thereon which, when executed by a processing circuit, cause the processing circuit to perform a method of wireless communication. The method can include sending one or more PDU session release requests to a wireless communication network system to request a PDU session release procedure where a timer can be used for the one or more PDU session release requests. The method can include determining whether a network response is received from the wireless communication network system before the timer expires and whether a number of times that the timer expires reaches a predetermined number of times. The method can further include locally releasing the PDU session when the network response is not received and the number of times that the timer expires reaches the predefined number of times.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
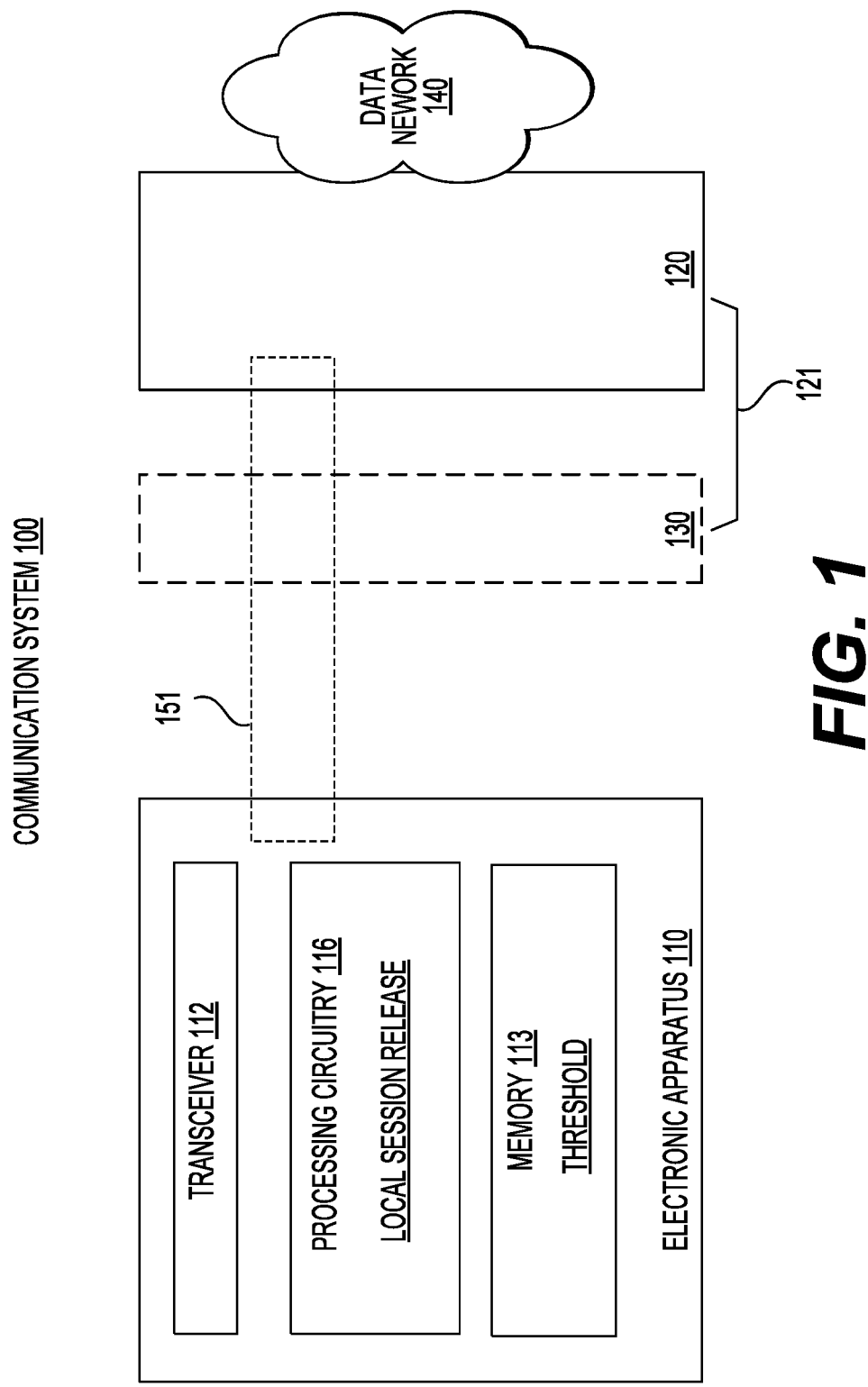
FIG. 1 shows an exemplary block diagram of a communication system 100 according to an embodiment of the disclosure.

FIG. 1 shows an exemplary block diagram of a communication system 100 according to an embodiment of the disclosure. The communication system 100 can include an electronic apparatus 110, a wireless communication network system 121 (also referred to as a network system 121), and a data network 140 providing wireless services to the electronic apparatus 110. In an embodiment, one or more sessions including a session 151, such as one or more packet data unit (PDU) sessions including a PDU session 151, can be configured to transmit data packets between the electronic apparatus 110 and the network system 121. According to aspects of the disclosure, the electronic apparatus 110 can be configured to send one or more session release requests, such as one or more PDU session requests, to the network system 121 to request a session release procedure, such as a PDU session release procedure, that releases the session 151. The electronic apparatus 110 can determine whether a network response from the network system 121 is received within a predetermined amount of time. When the network response is not received within the predetermined amount of time, the electronic apparatus 110 can locally release the session 151 without the network response. Subsequently, the electronic apparatus 110 can indicate a session status, such as a PDU session status, of the session 151 to the network system 121. In an embodiment, a timer is used for the one or more PDU session release requests. The electronic apparatus 110 can determine whether the network response is received from the wireless communication network system before the timer expires and whether a number of times that the timer expires reaches a predetermined number of times. The electronic apparatus 110 can locally release the PDU session when the network response is not received and the number of times that the timer expires reaches the predefined number of times. The predetermined amount of time can be determined based on the predetermined number of times that the timer expires.

The network system 121 can be any suitable network capable of transmitting data between devices, such as between the electronic apparatus 110 and the data network 140, thus providing wireless services to the electronic apparatus 110. For example, the network system 121 can be a service provider network including a wireless communication service provider network, a mobile service provider network, a machine type communication (MTC) network, a wired broadband network, and the like. The network system 121 can further include an access network (AN) 130 and a core network (CN) 120. The core network 120 can be connected to the data network 140.

The access network 130 can implement access technologies and connect the electronic apparatus 110 to the core network 120 using any suitable network technology, such as wired, wireless, fiber optical network, any suitable combination thereof, and the like. In an example, the access network 130 can be a radio access network (RAN), such as a Global System for Mobile Communications (GSM) RAN (GRAN), an Universal Mobile Telecommunications System (UMTS) RAN (UTRAN), an Evolved Universal Terrestrial RAN (EUTRAN), a fifth generation (5G) RAN or Next Generation (NG) RAN compliant with the 5G standard developed by the 3rd Generation Partnership Project (3GPP), and the like. The access network 130 can include a plurality of access network nodes, such as base stations, Node Bs (NBs), evolved Node Bs (eNBs), 5G next generation node Bs (gNBs), and the like.

The core network 120 can be any suitable network configured to provide services, such as authentication, accounting, session management, mobility management, and the like, to the electronic apparatus 110. In an example, the core network 120 can be a GSM/(General Packet Radio Service) GPRS core network used for GSM and Wideband Code Division Multiple Access (WCDMA), a core network compliant with the 4th Generation (4G) standard developed by 3GPP such as an evolved packet core (EPC), a 5G core network (5GC) compliant with the 5G standard developed by 3GPP, and the like. The core network 120 can include a plurality of core network nodes, such as mobility management entity (MME), serving gateway (S-GW), packet data network (PDN) gateway (P-GW), home subscriber service (HSS) node, and the like used in the EPC, as well as access and mobility function (AMF), session management function (SMF), user plane function (UPF), user data management (UDM), policy control function (PCF), network slice selection function (NSSF), authentication server function (AUSF), short message service function (SMSF), location management function (LMF), and the like used in the 5GC.

In an embodiment, the network system 121 can be implemented using hardware components, software components, firmware components, any suitable combination thereof, and the like. The access network and core network nodes within the network system 121 can be coupled together by any suitable network technology, such as wired, wireless, fiber optical network, any suitable combination thereof, and the like. In an example, the network system 121 can be a 4G system (4GS) such as an evolved packet system (EPS) including an EUTRAN and an EPC. In an example, the network system 121 can be a 5GS including a 5G NR and a 5GC.

In an embodiment, the session 151 connecting the electronic apparatus 110 and the core network 120 can be employed to provide wireless services to the electronic apparatus 110. In an example, the session 151 is an EPS session, i.e., a packet data network (PDN) connection when the network system 121 is an EPS. In an example, the session 151 is a PDU session when the network system 121 is a 5GS. The session 151 can be based on any suitable protocols, such as internet protocol (IP) and non-IP, IP version 4 (IPv4), IP version 6 (IPv6), Ethernet, Unstructured used in 5GC, and the like. In general, the session 151 can be established, modified, and released by the electronic apparatus 110 and/or the network system 121. In addition, the session 151 can also be handed over between the network system 121 and another network system.

The electronic apparatus 110 can be any suitable electronic apparatus configured to communicate with the network system 121 and receive wireless services. The electronic apparatus 110 can be configured to communicate with a 4GS, a 5GS, or the like. In an example, the electronic apparatus 110 is a terminal device used by an end-user for mobile telecommunication, such as a cell phone, a smart phone, a tablet computer, and the like. In another example, the electronic apparatus 110 is an MTC device, such as a wireless meter, a wireless sensor, a wireless actuator, and the like. Any suitable number of electronic apparatuses that function similarly as the electronic apparatus 110 can be included in the communication system 100.

The electronic apparatus 110 can include a transceiver 112, a memory 113, processing circuitry 116, and the like. According to aspects of the disclosure, the electronic apparatus 110 can be configured to implement a local session release procedure, such as a local PDU session release procedure. The transceiver 112 can communicate with the network system 121. In an example, the transceiver 112 can communicate wirelessly with an access network node of the access network 130, such as an eNB, a gNB, and the like. According to aspects of the disclosure, the transceiver 112 can send a session release request to the network system 121 and subsequently receive a network response from the network system 121, for example, indicating whether the session release request is accepted by the network system 121. The transceiver 121 can also send a session status, such as a PDU session status, to the network system 121. For example, the transceiver 112 sends a message indicating the session status of the session 151. For example, the session status can indicate whether the session 151 is released by the electronic apparatus 110. In some examples, the processing circuitry 116 can implement the following procedures including sending the session release request to the network system 121, receiving the network response, sending the message indicating the session status of the session 151, and the like.

In an embodiment, the session 151 is not used by the electronic apparatus 110, and the electronic apparatus 110 initiates a session release procedure by sending a session release request to the network system 121. In addition, the processing circuitry 116 starts a timer. When the transceiver 112 does not receive a network response from the network system 121 when the timer expires and resends the session release request, the processing circuitry 116 can reset and restart the timer. In an example, when the network response is received before the timer expires, the timer is stopped and the session 151 is released based on the network response. According to aspects of the disclosure, the processing circuitry 116 can determine whether the network response is received each time the timer expires. The processing circuitry 116 can further calculate a number of times that the timer expires and determine whether the number of times reaches a threshold, such as a predetermined number of times that the timer expires. Therefore, the processing circuitry 116 can determine whether the network response is received when the number of times the timer expires reaches the threshold. The threshold can also indicate a maximum number of the session release requests sent to the network system 121, and thus, the processing circuitry 116 can determine whether the network response is received when the number of the session release requests sent to the network system 121 reaches the threshold. In various examples, the number of times the timer expires is equal to the number of the session release requests sent to the network system 121. When the network response is determined not received and the number of the session release requests reaches the threshold, the processing circuitry 116 can locally release the session 151 without the network response. Further, the processing circuitry 116 can abort the session release procedure. In an example, the session release request includes an identifier allocated for the session release procedure, and the processing circuitry 116 releases the allocated identifier. The threshold can be obtained from the network system 121 or stored in the memory 113.

The memory 113 can be configured to store instructions to control operations of the electronic apparatus 110. The memory 113 can store the threshold. The memory 113 can be any suitable memory including non-volatile memory such as one or more non-volatile memory chips, volatile memory such as random access memory (RAM), or any suitable combination thereof.

In an embodiment, the electronic apparatus 110 can be a system-on chip (SOC) where components, such as the transceiver 112, the memory 113, and the processing circuitry 116, are located on a single integrated circuit (IC) chip. Alternatively, the components in the electronic apparatus 110 can be distributed across multiple ICs. In an embodiment, the processing circuitry 116 can be implemented using hardware components, software components, firmware components, or any combination thereof. In an example, the software implementing the local session release procedure can be stored in the memory 113 and be executed by hardware components located in the processing circuitry 116.

In an embodiment, during operation, the session 151 between the electronic apparatus 110 and the network system 121 is not used by the electronic apparatus 110. The electronic apparatus 110 then initiates a session release procedure by sending a session release request to the network system 121. In addition, the processing circuitry 116 starts a timer. The processing circuitry 116 determines whether the network response is received each time the timer expires. In an example, when the timer expires after a certain temporal duration, the transceiver 112 does not receive a network response from the network system 121, for example, due to signaling loss between the electronic apparatus 110 and the access network 130, the core network 120 not processing the session release request, or the like. The processing circuitry 116 calculates a number of times that the timer expires and determines whether the number of times reaches the threshold. Alternatively, the processing circuitry 116 calculates the number of the session release requests sent to the network system 121 and determines whether the number reaches the threshold.

When the number of the session release requests or the number of times that the timer expires is less than the threshold, and the network response is not received, the transceiver 112 resends the session release request and the processing circuitry 116 resets and restarts the timer. When the network response is determined not received and the number of the session release requests or the number of times that the timer expires reaches the threshold, the processing circuitry 116 locally releases the session 151 without the network response and aborts the session release procedure. Further, the transceiver 112 sends a session status of the session 151 to the network system 121, such as the session 151 being released by the electronic apparatus 110.

The predetermined amount of time can be related to the number of times the timer expires. For example, the timer can be run five times over five consecutive temporal durations, and the predetermined amount of time can be a sum of the five consecutive temporal durations.

Figure 2:
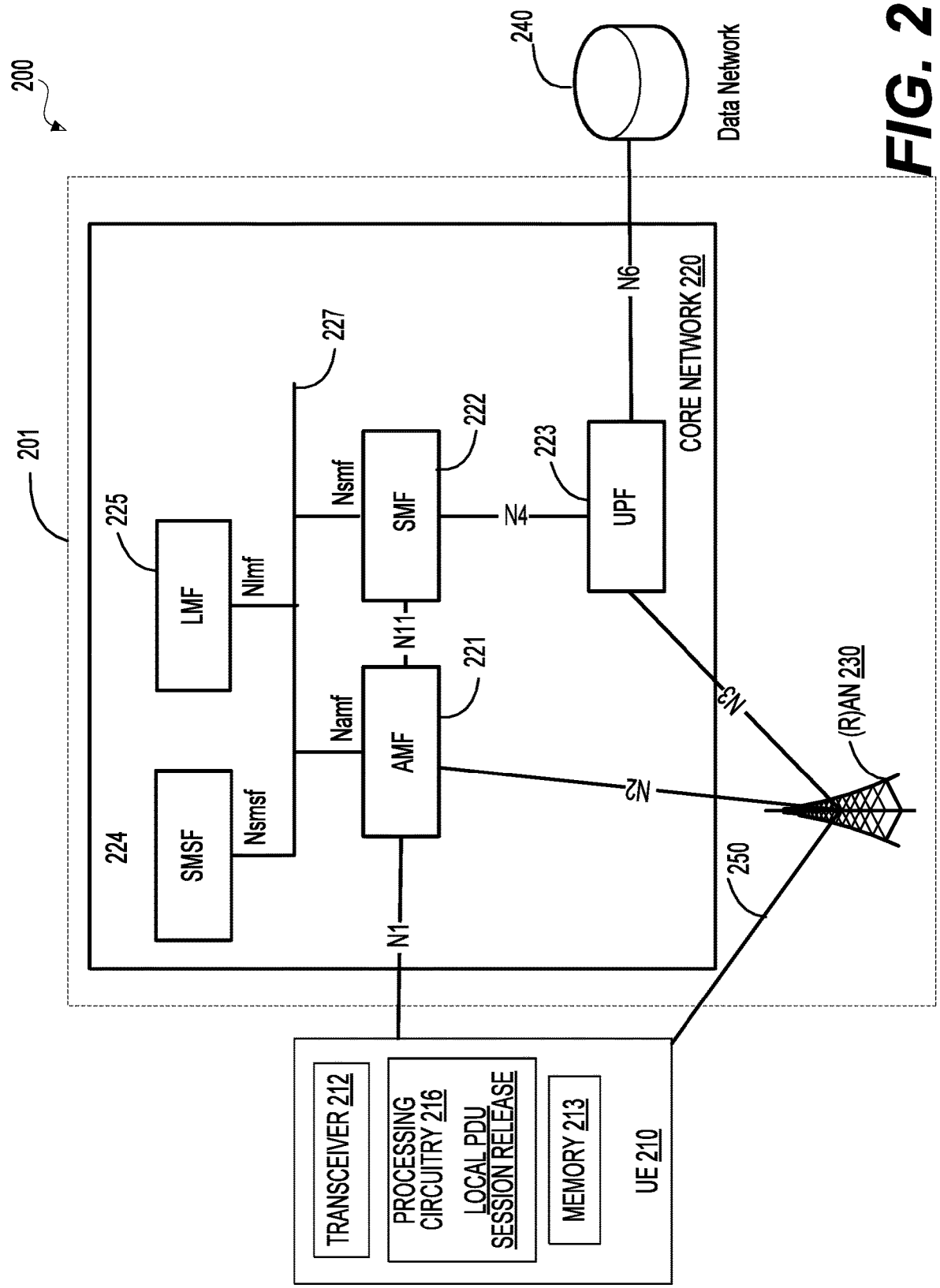
FIG. 2 shows an exemplary block diagram of a communication system 200 according to an embodiment of the disclosure.

FIG. 2 shows an exemplary communication system 200 according to an embodiment of the disclosure. As shown, the communication system 200 can include a user equipment (UE) 210, a 5GS 201, and a data network (DN) 240. The 5GS 201 includes a CN 220 and an (radio) access network ((R)AN) 230.

The UE 210 can be any suitable device or network element capable of signal transmission and reception, similar to the electronic apparatus 110 in FIG. 1. The UE 210 can include a transceiver 212, processing circuitry 216, and a memory 213. The UE 210 is configured to implement a local PDU session release procedure, similar to that described with reference to FIG. 1, thus, detailed descriptions are omitted for purpose of brevity.

The core network 220 can provide service management and delivery over wireless, fixed, or converged networks. In the FIG. 2 example, the core network 220 uses a service-based architecture to support interactions between different network functions (NFs). The core network 220 can include multiple NFs, such as an AMF 221, a SMF 222, a UPF 223, a SMSF 224, a LMF 225, and/or other NFs not shown in FIG. 2.

In various embodiments, the 5GS 201 allows a control plane (CP) and user plane (UP) split in the core network 220 for independent scalability, evolution and flexible deployments. In the FIG. 2 example, the UP functions can include one or more UPFs 223 that support UP data processing. The CP functions can include the AMF 221, the SMF 222, the SMSF 224, the LMF 225, and the like. The AMF 221 can manage access control and mobility, and support other NFs to communicate with the UE 210 and the (R)AN 230, and the like. The SMF 222 can provide session management, IP address allocation and management, UP function selection and control, and the like. The SMSF 224 can manage the SMS subscription and delivery over the non-access stratum (NAS) and the like. The LMF 225 can support location measurement and determination for the UE 210, uplink location measurement from the (R)AN 230, and the like. These NFs can be connected to each other over their respective service-based interfaces (SBI) through a SBI message bus 227, as shown in FIG. 2. Particularly, Namf is the SBI exhibited by the AMF 221, Nsmf is the SBI exhibited by the SMF 222, Nsmsf is the SBI exhibited by the SMSF 224, and Nlmf is the SBI exhibited by the LMF 225.

A NF can interact with another NF by using a reference point. For example, the 5GS 201 includes following reference points: N1 between the UE 210 and the AMF 221, N2 between the (R)AN 230 and the AMF 221, N3 between the (R)AN 230 and the UPF 223, N4 between the SMF 222 and the UPF 223, N6 between the UPF 223 and the DN 240, and N11 between the AMF 221 and the SMF 222. The 5GS 201 can also include other reference points not shown in FIG. 2.

In some examples, SBIs and reference points are two different ways to represent the interactions between different NFs. A reference point between two NFs can be replaced by the SBIs between the two NFs. For example, the reference point N11 between the AMF 221 and the SMF 222 can be replaced by the SBIs of the AMF 221 and the SMF 222, i.e., Namf and Nsmf.

The (R)AN 230 implements access technologies. The (R)AN 230 provides connection between the UE 210 and the core network 220. For wireless cellular communication system, the 5GS 201 can employ 5G technologies developed by the 3GPP. Thus, the UE 210 can establish a 3GPP or a non-3GPP access link 250 to the (R)AN 230. Specifically, the 3GPP access is based on the radio access technology specified by 3GPP, such as 5G NR. The non-3GPP access is based on the access technologies that are not specified by 3GPP, such as Wireless Fidelity (Wi-Fi) and Bluetooth. The (R)AN 230 can connect to the AMF 221 and the UPF 223 of the core network 220 through the reference point N2 and N3, respectively.

The DN 240 is a digital network that can provide different Internet services and applications to the UE 210 through one or more PDU session(s). The PDU sessions can be established, modified, and released by the core network 220 and/or the UE 210. The Internet services and applications can be access to World Wide Web (WWW), digital video, digital audio, cloud storage and server, the use of email and instant message (IM) applications, and the like.

In an embodiment, a PDU session can be established between the UE 210 and the core network 220. 5GS session management (5GSM) can be performed on an N1 NAS signaling connection and can handle the PDU session in the UE 210 and in the SMF 222 (via the AMF 221). 5GSM procedures can include procedures initiated by the 5GS 201 and can be used for authentication and authorization or manipulation of the PDU session, such as PDU authentication and authorization, network-initiated PDU session modification, network-initiated PDU session release, and the like. 5GSM procedures can include procedures initiated by the UE 210, such as PDU session establishment, PDU session modification, PDU session release, and the like.

In an example, the UE 210 initiates a PDU session release procedure by sending a PDU session release request message and a PDU session release identifier (ID) to the SMF 222. The PDU session release request message can further include a procedure transaction ID (PTI) allocated for the PDU session release. In addition, the UE 210 starts a timer. For example, the timer is a timer T3582. Upon receipt of the PDU session release request message and the PDU session ID, the SMF 222 performs the network-requested PDU session release procedure if the SMF 222 accepts the request to release the PDU session. Alternatively, if the SMF 222 does not accept the request to release the PDU session, the SMF 222 send a PDU session release reject message to the UE 210. Subsequently, the UE 210 stops the timer T3582.

The network-requested PDU session release procedure described above can include 1) sending a PDU session release command message from the SMF 222 to the UE 210 and starting a timer, such as a timer T3592; and 2) sending a PDU session release complete message from the UE 210 to the SMF 222 and stopping the timer, such as the timer T3592.

In an example, the UE 210 initiates a PDU session release procedure by sending a PDU session release request message and a PDU session ID to the SMF 222. Similarly, the PDU session release request message can further include a PTI value allocated for the PDU session release. In addition, the processing circuitry 216 starts the timer T3582. However, the transceiver 212 does not receive a network response from the SMF 222 when the timer T3582 expires after a certain temporal duration, for example, due to signaling loss between the UE 210 and the (R)AN 230, the core network 220 not processing the PDU session release request message, or the like. Accordingly, the transceiver 212 can resend the PDU session release request message, and the processing circuitry 216 can reset and restart the timer T3582. If the transceiver 212 still does not receive the network response when the timer T3582 expires, the UE 210 can repeat the above described procedure (i.e., resending the PDU session release request message, resetting and restarting the timer T3582) for a number of times.

According to aspects of the disclosure, the UE 210 can determine whether the network response is received when a number of the PDU session release request messages sent to the SMF 222 reaches the threshold, such as a maximum number of the PDU session release request messages sent to the SMF 222, similar to that described with reference to FIG. 1. When the network response is not received and the number of the PDU session release request messages reaches the threshold, the processing circuitry 216 can locally release the PDU session without the network response from the SMF 222. In an example, the threshold is 5, and thus, the UE 210 can resend the PDU session release request message, reset and restart the timer four times. Accordingly, upon the fifth expiration of the timer T3582, the processing circuity 216 can locally release the PDU session. Further, the processing circuity 216 can abort the PDU session release procedure and release the allocated PTI. Subsequently, the UE 210 can perform registration procedure for mobility or periodic registration update to synchronize with the core network 220, for example, by sending a registration request message that includes a PDU session status information element (IE). The PDU session status IE can indicate that the PDU session is released by the UE 210. The core network 220 can subsequently release the PDU session. In various example, the processing circuitry 216 can implement the following procedures including sending the PUD session release request message to the SMF 222, receiving the network response, sending the registration request message, and the like.

As described above, the above description can be suitably adapted. For example, the UE 210 can determine whether the network response is received when a number of times that the timer T3582 expires reaches the threshold, such as a predetermined number of times that the timer T3582 expires, similar to that described with reference to FIG. 1. When the network response is not received and the number of times that the timer T3582 expires reaches the threshold, the processing circuitry 216 can locally release the PDU session without the network response from the SMF 222.

The predetermined amount of time can be related to the number of times the timer T3582 expires. For example, the timer T3582 can be run five times over five consecutive temporal durations, and the predetermined amount of time can be a sum of the five consecutive temporal durations.

Figure 3:
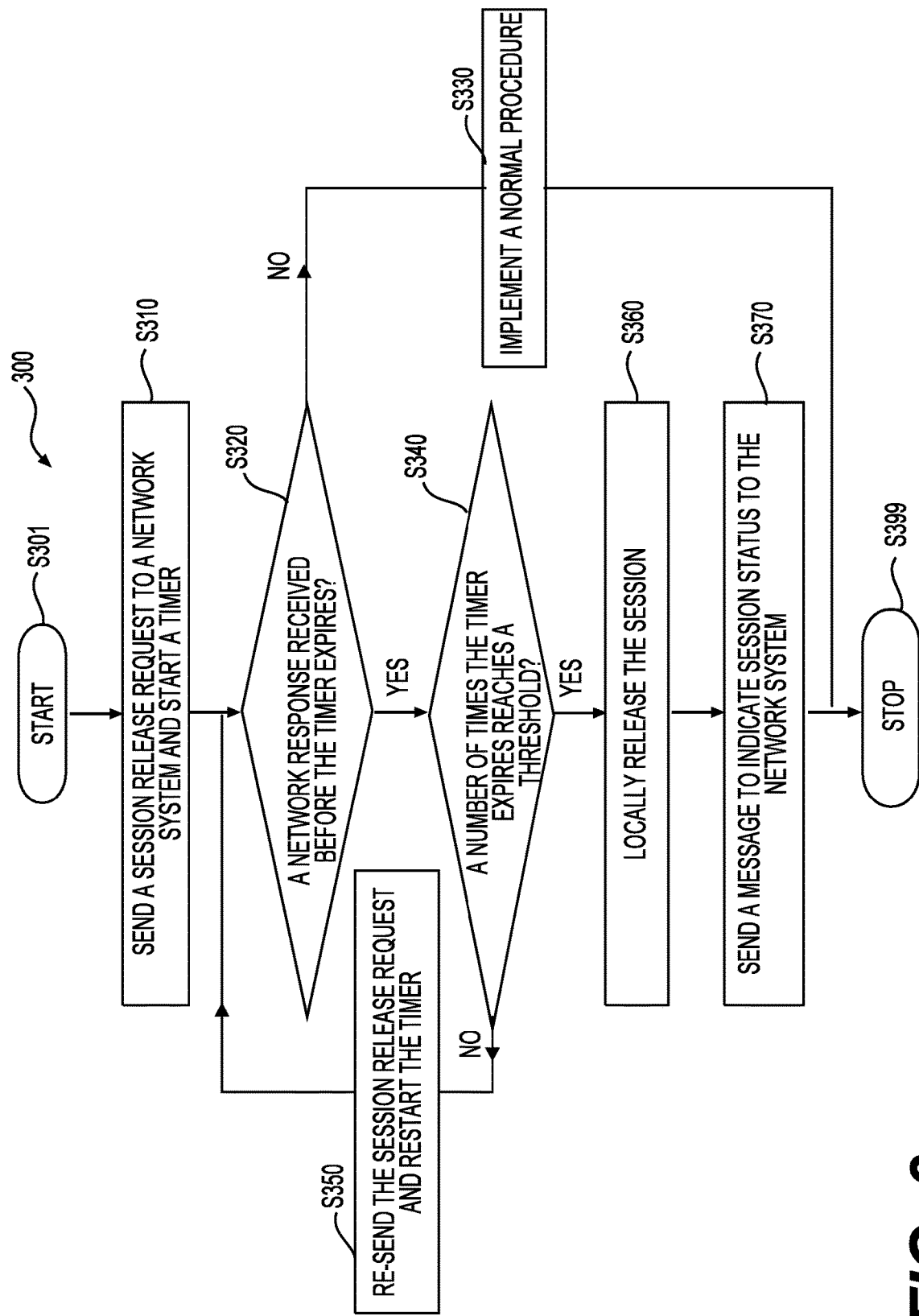
FIG. 3 shows a flow chart outlining an exemplary process 300 according to an embodiment of the disclosure.

FIG. 3 shows a flow chart outlining an exemplary process 300 according to an embodiment of the disclosure. In an example, the process 300 can be executed by the communication system 100 in FIG. 1 or the communication system 200 in FIG. 2 to implement the local session release procedure. For purposes of brevity, the process 300 is described using the communication system 100 in FIG. 1 as an example.

The process 300 starts at S301. The electronic apparatus 110 is served by the network system 121 via the session 151.

At S310, a session release request is sent to the network system 121 and a timer is started. In an example, the session 151 is not used by the electronic apparatus 110, and the transceiver 112 can send the session release request to initiate a release of the session 151. The session release request can further include a session ID of the session 151. The processing circuitry 116 can start the timer.

At S320, whether a network response is received before the timer expires is determined, for example, by the processing circuitry 116. When the network response is received before the timer expires, the process 300 proceeds to S330. Otherwise, the process 300 proceeds to S340.

At S330, a normal procedure to release the session 151 is implemented. For example, the network system 121 can accept the session release request, and thus, the session 151 is released subsequently based on the network response. Alternatively, the network system 121 can reject the session release request, and thus, the session 151 is not released based on the network response. The process 300 then proceeds to S399, and terminates.

At S340, whether a number of times that the timer expires reaches a threshold is determined. As described above, in an example, the threshold indicates a predetermined number of times that the timer expires. The threshold can be any suitable positive integer. In an example, the threshold is 5. The processing circuitry 116 can count the number of times that the timer expires, and compare the number of times that the timer expires with the threshold. When the number of times reaches the threshold, the process 300 proceeds to S360. Otherwise, the number of times is less than the threshold, and the process 300 proceeds to S350.

At S350, the session release request is resent, for example, by the transceiver 112, and the timer is reset and restarted. The process 300 proceeds to S320.

At S360, the number of times reaches the threshold and the network response is not received, the session 151 is locally released without the network response, such as described above with reference to FIG. 1. In various examples, when the session 151 is locally released without the network response, the session 151 is released by the electronic apparatus 110 without signaling from the network system 121. In an example, the session 151 is released without peer-to-peer signaling between the network system 121, such as the core network 120 and the electronic apparatus 110. In an example, a session state of the session 151 can be changed from being active to inactive when the session 151 is released, and further, parameters and information associated with the session 151 are released accordingly. In an example, modem in the electronic apparatus 120 can report to upper layers that the session 151 is released without waiting for the network response form the network system 121.

At S370, a message is sent to the network system 121 to indicate a session status of the session 151. For example, the message can indicate that the session 151 is released, and thus, the network system 121 can subsequently release the session 151. The process 300 then proceeds to S399, and terminates.

The process 300 can be suitably adapted. In an example, the threshold indicates a maximum number of the transmitted session release requests, as described in FIG. 1, and accordingly, at S340, whether a number of the transmitted session release requests reaches the threshold is determined.

Certain steps in the process 300 can be omitted or combined. In an example, steps S320, S340, and/or S350 can be combined to determine whether the network response is received within the predetermined amount of time.

Figure 4:
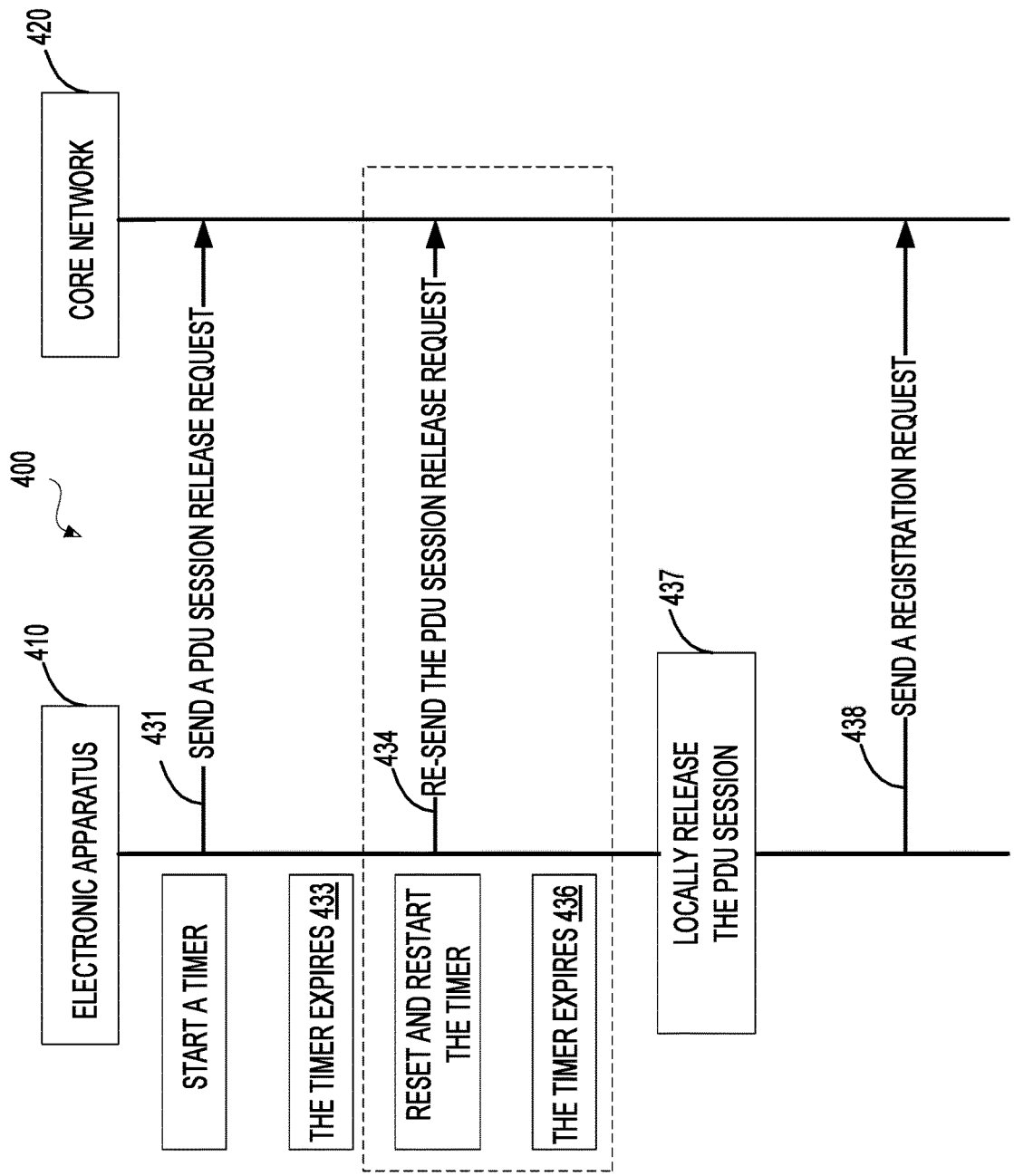
FIG. 4 shows a process 400 performed by an electronic apparatus and a core network in a communication system according to an embodiment of the disclosure.

FIG. 4 shows a process 400 performed by an electronic apparatus 410 and a core network 420 in a communication system according to an embodiment of the disclosure. In an example, the process 400 can be executed by the communication system 100 in FIG. 1 or the communication system 200 in FIG. 2 to implement the local session release procedure. For purposes of brevity, the process 400 is described using the communication system 200 in FIG. 2 as an example.

The electronic apparatus 410 has similar or identical functions and components as the electronic apparatus 110 and the UE 210 as described above. For purposes of brevity, the detailed descriptions are omitted. The core network 420 has similar or identical functions and components as the core networks 120 and 220 as described above. For purposes of brevity, the detailed descriptions are omitted. In the description below, the core network 420 is a 5GC, similar to the core network 220 in FIG. 2. The core network 420 includes a SMF. A PDU session between the electronic apparatus 410 and the core network 420 is not used by the electronic apparatus 410, and thus, the electronic apparatus 410 initiates a PDU session release procedure.

At S431, a PDU session release request message is sent to the core network 420. The PDU session release request message can further include a PDU session ID of the PDU session and a PTI value allocated for the PDU session release procedure. Further, a timer, such as the timer T3582, can be started by processing circuitry of the electronic apparatus 410.

At S433, the timer T3582 expires, and no network response is received by the electronic apparatus 410.

At S434, the PDU session release request message is resent or retransmitted to the core network 420. Similarly, the timer T3582 is reset and restarted.

At S436, the timer T3582 expires again, and no network response is received by the electronic apparatus 410.

Steps S434 and S436 can be implemented for N times where N is a positive integer. In an example, N is 4, after implementing steps S434 and S436 4 times, i.e., upon a 5$^{th}$ expiration of the timer T3582, the process proceeds to S437.

At S437, the electronic apparatus 410 determines that the timer T3582 expires (N+1) times, the PDU session release request messages are sent (N+1) times, and no network response is received. In an example, the threshold is (N+1) times, and thus, the (N+1) times that the timer T3582 expires reaches the threshold. Accordingly, the PDU session is locally released without the network response, and thus, without signaling from the core network 420. Further, the electronic apparatus 410 aborts the PDU session release procedure and release the PTI. In an example, the PDU session is released without peer-to-peer signaling between the core network 420 and the electronic apparatus 410. In an example, a 5GSM state of the PDU session can be changed from PDU session active to PDU session inactive when the PDU session is released, and further, parameters and information allocated for the PDU session are released accordingly. In an example, modem in the electronic apparatus 410 can report to upper layers that the PDU session is released without waiting for the network response form the core network 420.

At S438, a registration procedure for mobility or periodic registration update is implemented, for example, by sending a registration request message to the core network 420 to indicate a session status of the PDU session. In an example, the electronic apparatus 410 and the core network 420 are not synchronized when the PDU session is locally released, and thus, PDU session status for the electronic apparatus 410 can be different from PDU session status for the core network 420. The registration request message can indicate that the PDU session 151 is released by the electronic apparatus 410, and thus, the core network 420 can subsequently release the PDU session. In an example, the registration request message includes a PDU session status IE that indicates the PDU session status. The registration procedure at S438 can synchronize the electronic apparatus 410 and the core network 420.

The local session release procedure or the local PDU session release procedure as described with reference to FIGS. 1-4 can offer certain benefits. For purpose of brevity, the benefits are described with reference to FIG. 4. The electronic apparatus 410 does not need to maintain the PDU session to be released. However, after repeating S434 and S436 N times, when the local session release procedure is not implemented, the electronic apparatus 410 performs a registration procedure for mobility or periodic registration update and then continues to send the PDU session release request message, reset, and restart the timer T3582. In some examples, the registration procedure, the retransmission of the PDU session release request message, and the usage of the timer T3582 are repeated more than the threshold, such as the predetermined number of times that the timer T3582 expires, described in the disclosure before the PDU session is released, and thus, increasing power consumption and signaling overhead. On the contrary, when the local session release procedure is implemented, the electronic apparatus 410 locally release the PDU session without signaling from the core network 420, and thus, the registration procedure is implemented one time (at S438) and the retransmission of the PDU session release request message and the usage of the timer T3582 are repeated less than or equal to the threshold, and thus, reducing power consumption and signaling overhead.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What claimed is:

1. An electronic apparatus for wireless communication including processing circuitry that is configured to:
send one or more packet data unit (PDU) session release requests to a wireless communication network system to request a PDU session release procedure, a timer being used for the one or more PDU session release requests;
start the timer when each of the one or more PDU session release requests is sent, wherein the one or more PDU session release requests include a procedure transaction identifier (PTI) allocated for the PDU session release procedure;
determine whether a network response is received from the wireless communication network system before the timer expires,
restart the timer when a network response is not received and the timer expires;
count a number of times that the timer expires and the network response is not received from the wireless communication system;
determine whether the number of times that the timer expires reaches a predetermined number of times that is two or more times; and
when the network response is not received and the number of times that the timer expires reaches the predefined number of times:
locally release the PDU session;
abort the PDU session release procedure; and
release the allocated PTI.

2. The electronic apparatus of claim 1, wherein the processing circuitry is further configured to:
send a PDU session status to the wireless communication network system after locally releasing the PDU session.

3. The electronic apparatus of claim 1, wherein
the one or more PDU session release requests include an identifier allocated for the PDU session release procedure; and
when the network response is not received and the number of times that the timer expires reaches the predefined number of times, the processing circuitry is further configured to:
abort the PDU session release procedure; and
release the allocated identifier.

4. The electronic apparatus of claim 1, wherein the processing circuitry is further configured to:
for each of the one or more PDU session release requests, determine whether the network response is received before the timer expires; and
when the timer expires and the network response is not received, determine whether the number of times that the timer expires reaches the predetermined number of times.

5. The electronic apparatus of claim 1, wherein the timer is a timer T3582.

6. The electronic apparatus of claim 1, wherein
the wireless communication network system is a fifth generation (5G) wireless communication network system (5GS), the PDU session is between the electronic apparatus and a 5G core network (5GC) of the 5GS, and the one or more PDU session release requests includes an initial PDU session release request message followed by L additional PDU session release request messages, L being a positive integer; and the processing circuitry is further configured to:
  start the timer (L+1) times when the initial PDU session release request message and the L additional PDU session release request messages are sent, respectively; and
  send each of the L additional PDU session release request messages each time the timer expires.

7. The electronic apparatus of claim 6, wherein the processing circuitry is further configured to locally release the PDU session when the timer expires (L+1) times.

8. The electronic apparatus of claim 7, wherein the processing circuitry is further configured to:
  send a registration request to the 5GC that includes a PDU session status information element after locally releasing the PDU session.

9. The electronic apparatus of claim 7, wherein
  L is 4; and
  the processing circuitry is further configured to locally release the PDU session when the timer expires five times.

10. A method for wireless communication, comprising:
  sending one or more PDU session release requests to a wireless communication network system to request a PDU session release procedure, a timer being used for the one or more PDU session release requests;
  starting the timer when each of the one or more PDU session release requests is sent, wherein the one or more PDU session release requests include a procedure transaction identifier (PTI) allocated for the PDU session release procedure;
  determining whether a network response is received from the wireless communication network system before the timer expires,
  restarting the timer when a network response is not received and the timer expires;
  counting a number of times that the timer expires and the network response is not received from the wireless communication system;
  determining whether the number of times that the timer expires reaches a predetermined number of times that is two or more times; and
  when the network response is not received and the number of times that the timer expires reaches the predefined number of times:
    locally releasing the PDU session;
    aborting the PDU session release procedure; and
    releasing the allocated PTI.

11. The method of claim 10, further comprising:
  sending a PDU session status to the wireless communication network system after locally releasing the PDU session.

12. The method of claim 10, wherein
  the one or more session PDU release requests include an identifier allocated for the PDU session release procedure; and
  when the network response is not received and the number of times that the timer expires reaches the predefined number of times, the method further includes:
    aborting the PDU session release procedure; and
    releasing the allocated identifier.

13. The method of claim 10, further comprising:
  for each of the one or more PDU session release requests,
    determining whether the network response is received before the timer expires; and
    when the timer expires and the network response is not received, determining whether the number of times that the timer expires reaches the predetermined number of times.

14. The method of claim 10, wherein the timer is a timer T3582.

15. The method of claim 10, wherein
  the wireless communication network system is a fifth generation (5G) wireless communication network system (5GS), the PDU session is between the electronic apparatus and a 5G core network (5GC) of the 5GS, and the one or more PDU session release requests includes an initial PDU session release request message followed by L additional PDU session release request messages, L being a positive integer; and
  the method includes:
    starting the timer (L+1) times when the initial PDU session release request message and the L additional PDU session release request messages are sent, respectively; and
    sending each of the L additional PDU session release request messages each time the timer expires.

16. The method of claim 15, wherein the locally releasing the PDU session comprises locally releasing the PDU session when the timer expires (L+1) times.

17. The method of claim 16, further comprising:
  sending a registration request to the 5GC that includes a PDU session status information element after locally releasing the PDU session.

18. A non-transitory computer readable medium having computer readable instructions stored thereon which, when executed by a processing circuit, cause the processing circuit to perform a method of wireless communication, the method comprising:
  sending one or more PDU session release requests to a wireless communication network system to request a PDU session release procedure, a timer being used for the one or more PDU session release requests;
  starting the timer when each of the one or more PDU session release requests is sent, wherein the one or more PDU session release requests include a procedure transaction identifier (PTI) allocated for the PDU session release procedure;
  determining whether a network response is received from the wireless communication network system before the timer expires;
  restarting the timer when a network response is not received and the timer expires;
  counting a number of times that the timer expires and the network response is not received from the wireless communication system;
  determining whether the number of times that the timer expires reaches a predetermined number of times that is two or more times; and
  when the network response is not received and the number of times that the timer expires reaches the predefined number of times:
    locally releasing the PDU session;
    aborting the PDU session release procedure; and
    releasing the allocated PTI.

* * * * *